United States Patent
Baucom, Jr. et al.

(10) Patent No.: US 6,658,012 B1
(45) Date of Patent: Dec. 2, 2003

(54) STATISTICS FOR VLAN BRIDGING DEVICES

(75) Inventors: Michael Calvin Baucom, Jr., Apex, NC (US); Wynona Persephone Jacobs, Cary, NC (US); Colin Michael Winegarden, Holly Springs, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/560,028

(22) Filed: Apr. 27, 2000

(51) Int. Cl.$^7$ .......................... H01L 12/28; H01L 12/56
(52) U.S. Cl. ........................ 370/401; 370/402; 370/404
(58) Field of Search ................................. 370/422, 252, 370/241, 401, 402, 404; 709/223, 224, 250

(56) References Cited

U.S. PATENT DOCUMENTS

| | | | |
|---|---|---|---|
| 5,559,955 A | 9/1996 | Dev et al. | 395/182.02 |
| 5,572,533 A | 11/1996 | Sunada et al. | 371/20.1 |
| 5,664,105 A | 9/1997 | Keisling et al. | 395/200.54 |
| 5,699,348 A | 12/1997 | Baidon et al. | 370/242 |
| 5,748,905 A | 5/1998 | Hauser et al. | 395/200.79 |
| 5,818,842 A | 10/1998 | Burwell et al. | 370/397 |
| 5,835,710 A | 11/1998 | Nagami et al. | 395/200.8 |
| 5,850,388 A | 12/1998 | Anderson et al. | 370/252 |
| 5,878,232 A | 3/1999 | Marimuthu | 395/200.79 |
| 5,926,463 A | 7/1999 | Ahearn et al. | 370/254 |
| 5,946,308 A | 8/1999 | Dobbins et al. | 370/392 |
| 5,991,299 A * | 11/1999 | Radogna et al. | 370/392 |
| 6,032,194 A * | 2/2000 | Gai et al. | 709/239 |
| 6,185,214 B1 * | 2/2001 | Schwartz et al. | 370/401 |
| 6,286,052 B1 * | 9/2001 | McCloghrie et al. | 709/238 |
| 6,335,932 B2 * | 1/2002 | Kadambi et al. | 370/391 |

OTHER PUBLICATIONS

"IBM 8275 High–Performance Ethernet Workgroup Switch Model 416," International Business Machines Corporation 1999, 4 pp.

"Ethernet," Toronto Microelectronics Inc., available via the Internet at http;//www.tme–inc.com/html/service/general/ether.htm, pp. 1–8.

"Draft Standard P802.1Q/D10 IEEE Styandards for Local and Metropolitan Area Networks: Virtual Bridged Local Area Networks," IEEE, Mar. 22, 1998, pp. 1–212.

"Information Technology—Telecommunications and Information Exchange Between Systems—Local and Metropolitan Area Networks—Common Specifications—Part 3: Media Access Control (MAC) Bridges," IEEE, Mar. 19, 1998, pp. 1–377.

* cited by examiner

Primary Examiner—Wellington Chin
Assistant Examiner—Jamal A. Fox
(74) Attorney, Agent, or Firm—Winstead, Sechrest & Minick

(57) ABSTRACT

Counters are implemented within a bridge device so that adequate forwarding and transmission statistics can be monitored. The counting of frame discards as a result of ingress and egress rules implemented within the bridge are utilized within the IEEE 802.IQ VLAN bridge model to calculate the number of frames forwarded and the number of frames transmitted.

34 Claims, 3 Drawing Sheets

STATISTICS FOR VLAN BRIDGING DEVICES

TECHNICAL FIELD

The present invention relates in general to data processing networks, and in particular to a bridge utilized to couple a plurality of local area networks.

BACKGROUND INFORMATION

There are many different types of networks and network systems for sharing files and resources or for otherwise enabling communication between two or more computers. The term "network device" generally refers to a computer linked to a network via a network interface card (NIC), or to other devices that perform specialized functions in the network, such as repeaters or hubs, bridges, switches, routers and brouters, to name a few examples. Networks may be categorized based on various features and functions, such as message capacity, range over which nodes are distributed, node or computer types, node relationships, topology or logical and/or physical layout, architecture or structure based on cable type and data packet format, access possibilities, etc. For example, the range of a network refers to the distance over which nodes are distributed, such as local-area networks (LAN) within an office or floor of a building, wide-area networks (WANs) spanning across a college campus, or a city or a state and global-area networks (GANs) spanning across national boundaries.

A network may be expanded by using one or more repeaters, bridges, switches or similar type devices. A repeater is a device that moves all packets from one network segment to another by regenerating, re-timing, and amplifying the electrical signals. A bridge is a device that operates at the Data-Link Layer of the OSI (Open Systems Interconnection) Reference Model and passes packets from one network to another and increases efficiency by filtering packets to reduce the amount of unnecessary packet propagation on each network segment. A switch is a network device similar in function to a multiple port bridge, but includes a plurality of ports for coupling to several similar networks for directing network traffic among the networks.

Some bridging devices, such as multiple port bridges, switches, routers or the like include the capability for a user to define one or more Virtual LANs (VLANs). Separate VLANs enable separate address space to be associated with each VLAN. The user or network administrator defines one or more VLANs by grouping one or more ports together in a VLAN definition, where the bridging device effectively separates each VLAN from the other ports. Bridging devices which are VLAN-capable forward traffic amongst ports which are members of the same VLAN.

Within a bridge, it is often desired to monitor the performance of the bridge using various statistics. Bridge statistics are also useful in diagnosing network problems. Standard-based statistics defined for traditional 802.1D bridges and defined in RFC 2674 ("Definitions of Managed Objects for Bridges with Traffic Classes, Multicast Filtering and Virtual LAN Extensions") are inadequate to describe the number of frames forwarded or discarded for IEEE 802.1Q VLAN bridges. In the traditional bridge model described in IEEE 802.1D the number of frames forwarded by a bridge port can be deduced from the number of frames received and the number of frames discarded on that particular port by the forwarding process. As illustrated in FIG. 3, there was only a single simple forwarding process implemented within the 802.1D bridge 301 coupling LANs 302 and 303. Frames are received from LAN 302 into port 1 by frame reception 304, and then sent to forwarding process 305, which will perform a filtering process as a function of filtering parameters from filtering database 306. This filtering, or discarding, of frames in the forwarding process 305 is performed with respect to one or more filtering rules, which are described within the 802.1D specification. As a result, the number of frames forwarded from port 1 will equal the number of frames sent from frame reception 304 to forwarding process 305 minus the number of frames filtered, or discarded, within forwarding process 305. Then, the number of frames transmitted from frame transmission 307 to port 2 will equal the sum of all frames forwarded to the transmitting port 307 from the forwarding process 305.

However, as will be described herein, the new 802.1Q-based bridge model is considerably more complicated, and therefore the standards-based statistics implemented within the traditional 802.1D bridge 301 are inadequate.

SUMMARY OF THE INVENTION

The present invention addresses the foregoing need by implementing counters within a bridge so that adequate forwarding and transmission statistics can be monitored. The counting of frame discards as a result of ingress rules implemented within the bridge, and as a result of egress rules implemented within the bridge, are utilized within the 802.1Q VLAN bridge model to calculate the number of frames forwarded and the number of frames transmitted.

The additional counters serve two functions. The first function is to completely identify the number of frames received on a bridge port and actually forwarded to other bridge ports. This is provided by taking into account the number of frames that are received on a bridge port, but subsequently discarded because of ingress rules, as defined by IEEE 802.1Q. The number of frames forwarded from the bridge port is calculated as the number of frames received on a bridge port minus the number of frames discarded for any of the following reasons:

1. The forwarding process of the bridge mandates that the frame be discarded;
2. The frame has an unacceptable frame type (i.e., is incompatible with the acceptable frame types parameter configured for the bridge port);
3. The frame fails the ingress filtering rule configured for the bridge port; or
4. Other VLAN-related reasons mandate discarding the frame (i.e., no VLAN registration exists on the bridge for the VLAN ID carried within the frame).

The second function of the additional counters is to identify the number of frames submitted for transmission from a bridge port. This number is a subset of the number of frames forwarded to a bridge port from all other ports. This value is provided by taking into account the number of frames that are discarded because of egress rules, as identified by IEEE 802.1Q. This number can be derived from the number of frames forwarded to the bridge port from all other ports minus the number of frames discarded for any of the following reasons.

1. The port is not a member of the VLAN with which the frame is associated; or
2. The port is configured to transmit frames as untagged, and the frame's VLAN tag indicates the presence of embedded MAC addresses which cannot be translated into a format compatible with the local media with which the port is associated.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
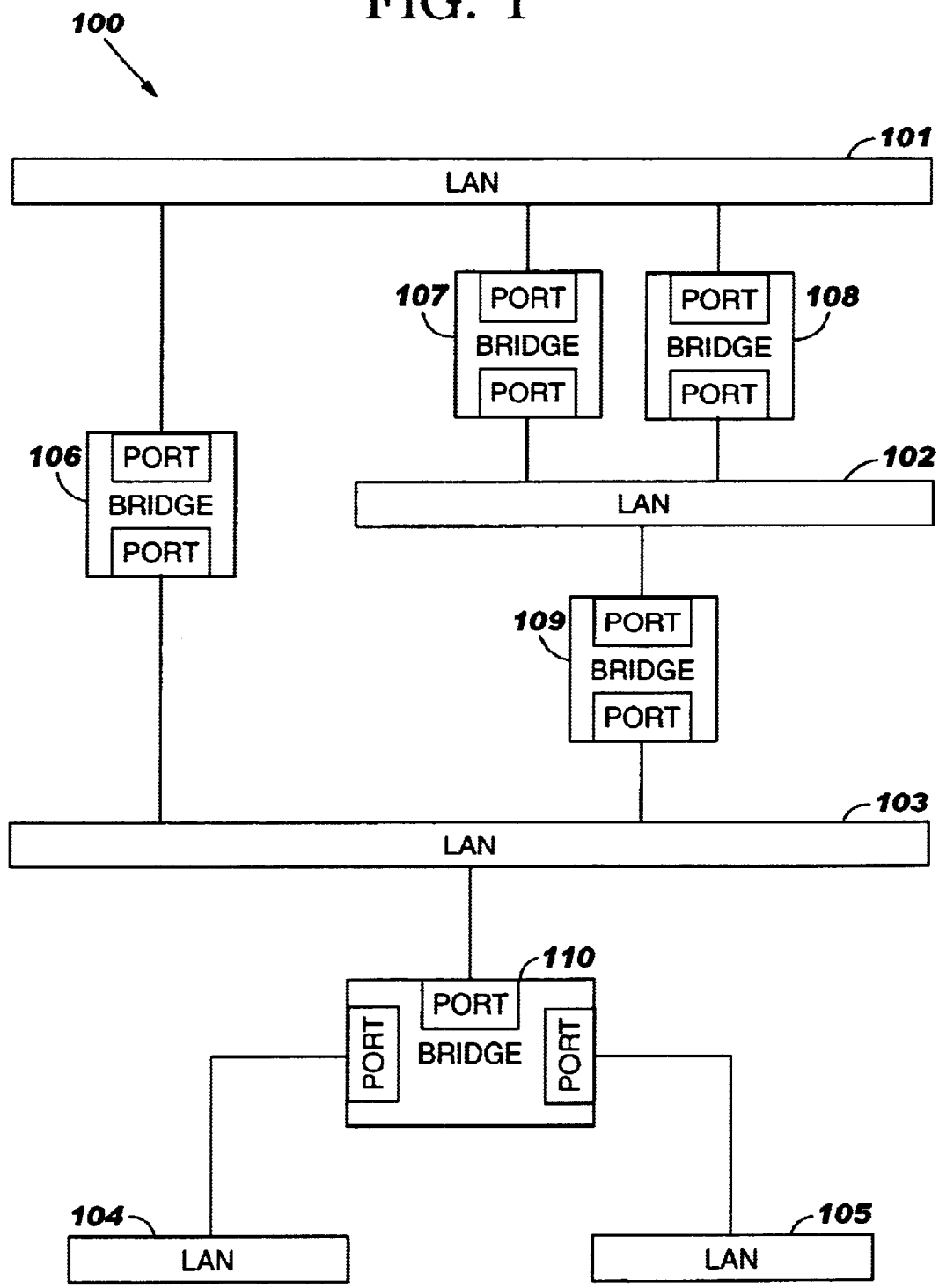
FIG. 1 illustrates a bridged local area network configured in accordance with the present invention.

In the following description, numerous specific details are set forth such as specific network topologies, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted in as much as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Referring to FIG. 1, there is illustrated an example of the physical topology of a bridged local area network (LAN) 100. The component LANs 101–105 are interconnected by means of MAC bridges 106–110; each port of a MAC bridge connects to a single LAN. For example, one port within bridge 106 connects to LAN 101, while the other port within bridge 106 connects to LAN 103. IEEE LANs of all types can be connected together by using MAC bridges. Each individual LAN has its own independent MAC. The bridged local area network 100 created allows the interconnection of stations attached to separate LANs as if they were attached to a single LAN, although they are in fact attached to separate LANs, each with its own MAC. A MAC bridge operates below the MAC service boundary, and is transparent to protocols operating above this boundary, in the Logical Link Control (LLC) sublayer or Network Layer. For further discussion of MAC bridges, refer to IEEE 802.1D which is hereby incorporated by reference herein. For further discussion of bridged LANs, refer to IEEE 802.1Q, which is hereby incorporated by reference herein.

Essentially, a virtual bridged LAN permits devices within various ones of the LANs to be combined into their own virtual LAN through the bridges.

Figure 2:
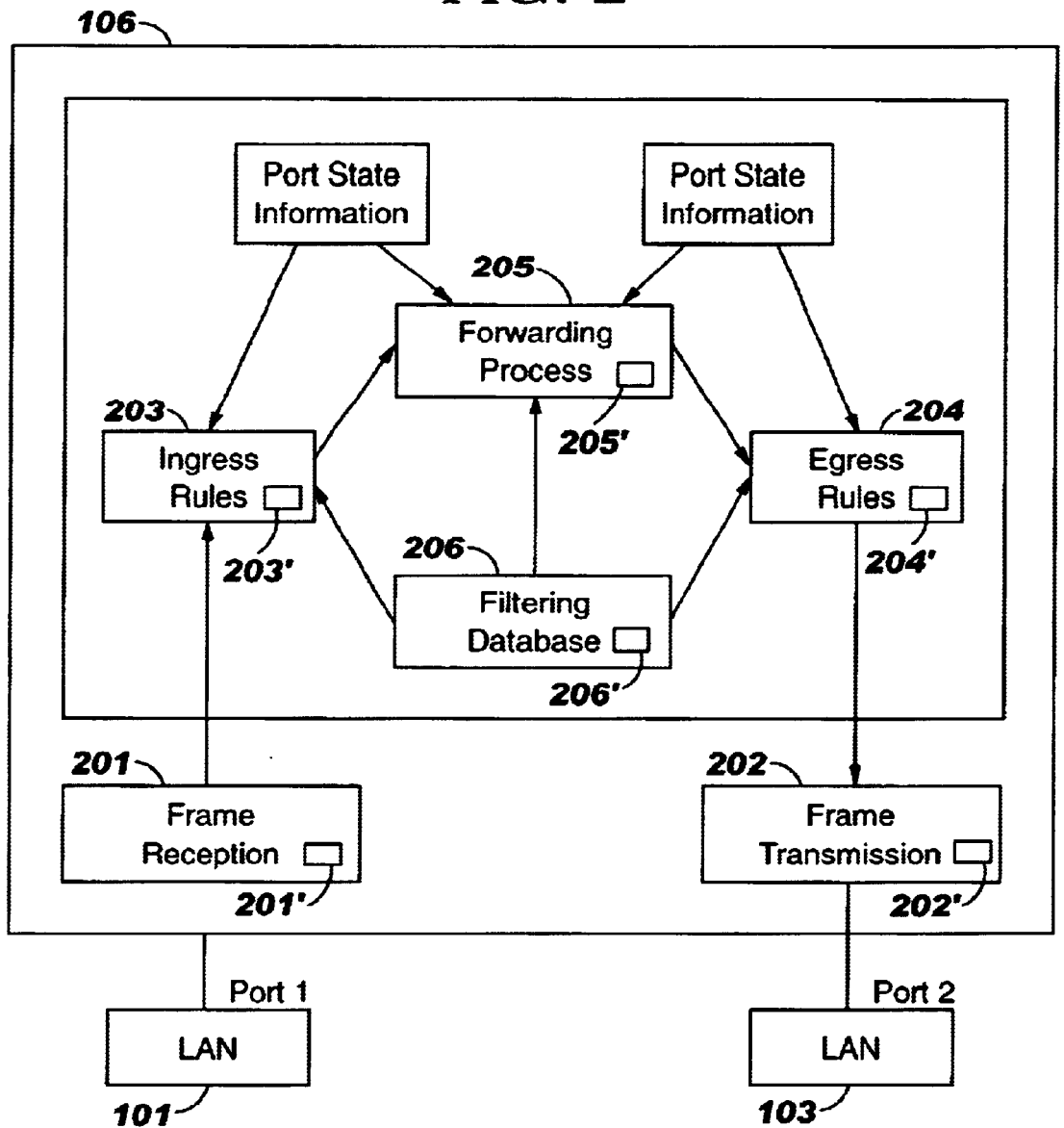
FIG. 2 illustrates an 802.1Q VLAN bridge model.
Figure 3:
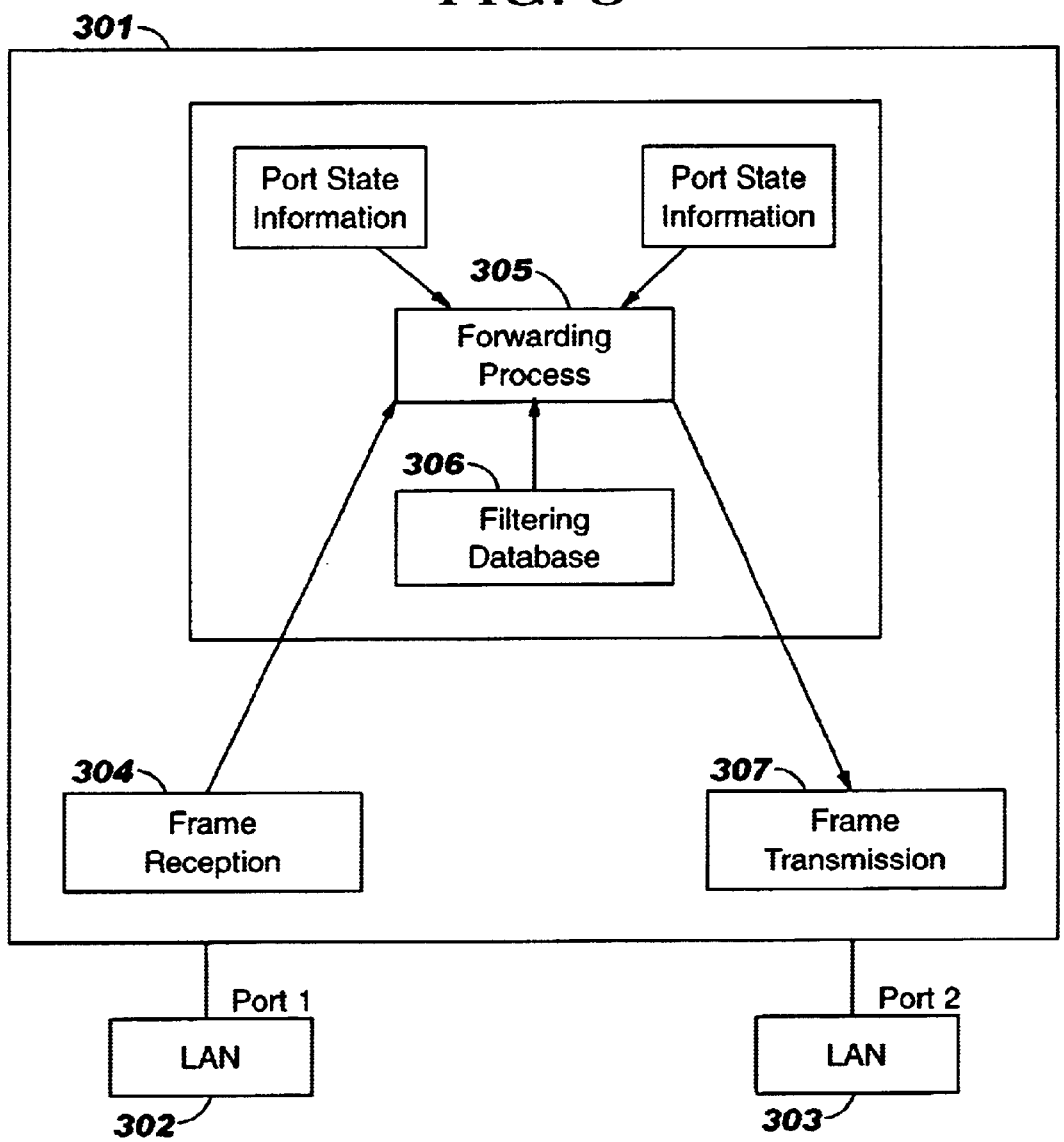
FIG. 3 illustrates an 802.1D bridge model.

Referring to FIG. 2, there is illustrated one example of a bridge within a bridged LAN, such as the exemplary configuration in FIG. 1. Illustrated is bridge 106 connected through port 1 to LAN 101 and port 2 to LAN 103. Bridge 106 conforms with the 802.1Q VLAN bridge model as defined by the IEEE 802.1Q standard. The addition of ingress and egress processing means that the number of frames forwarded by any one bridge port can no longer be directly inferred from the number of frames received and the number of frames discarded by the forwarding process. To satisfy this problem, the present invention adds additional counters, which are needed to provide network administrators with information as to the numbers of frames actually submitted to the forwarding process (that is, frames received and which pass ingress rules 203), and the number of frames forwarded to a bridge port, but not transmitted (that is, which pass the forwarding process 205, but are not submitted for frame transmission 202). Essentially, the ingress rules 203 and the egress rules 204 can result in further discards of frame packets for various reasons, which are discussed in more detail in IEEE 802.1Q.

The present invention is implemented using counters, such as 201' through 206', within bridge 106, wherein such counters can be implemented in either software or hardware. An example of a software counter would be a piece of code that would increment a count by monitoring the reason for deallocating buffers in bridge 106 through which frame packets were temporarily stored. For example, if a frame was forwarded from one process to another, in other words, control of the buffer containing the frame is passed from one process to another, the software code would make note of such a forwarding and increment any counters associated with the activity. Likewise, if a frame was not forwarded for some reason, in other words the frame was filtered or discarded, then a software counter would make note of such incident and also increment if so programmed.

First, a software counter will be utilized to count the number of frames received at port one and frame reception 201. The number of frame packets discarded by forwarding process 205 as a result of filtering database rules 206 would also be counted. The additional counters needed for complete knowledge of what is occurring on a VLAN bridge 106 are described in the table below.

| Frame Counter | Definition |
| --- | --- |
| Unacceptable Frame Type Discards | Number of frames received on this port but discarded on ingress due to being an unacceptable frame type. |
| Rcv VLAN Membership Mismatch Discards | Number of frames received on this port but discarded on ingress due to ingress filtering. (Note: This counter is identical to the "Discard on Ingress Filtering" counter described in Clause 12.6.1.1.3 of IEEE 802.1Q. This counter is being described here for completeness. However, it is not being listed as being new in this disclosure.) |
| Rcv Miscellaneous VLAN Discards | Number of frames received on this port but discarded for miscellaneous VLAN-related reasons (i.e. no VLAN registration exists on the bridge for the VLAN with which the frame is associates; there are no other bridge ports associated with the VLAN with which the frame is associated). |
| Xmit VLAN Membership Mismatch Discards | Number of frames forwarded to this port but discarded prior to transmission because the port is not a member of the VLAN with which the frame is associated. |
| Non-Translatable Discards | Number of frames forwarded to this port but discarded prior to transmission because embedded MAC addresses could not be translated if the frame were to be transmitted untagged. |

Note, the operational behavior of 802.1Q VLANs and the associated terminology is well defined in the specification referred to as the ANSI/IEEE Std. 802.1Q published by the American National Standards Institute and the Institute of Electronics Engineers.

As can be seen by the requirement for these additional counters, the ingress rules 203 result in frame discards for unacceptable frame types, VLAN membership mismatches, and other miscellaneous VLAN related reasons. Furthermore, the egress rules 204 also result in frame discards such as the discarding prior to transmission because the port to which the frames are to be transmitted is not a member of the VLAN with which the frame is associated, and the discarding of frames because the embedded MAC addresses could not be translated.

The present invention can then calculate the frames forwarded from port one by summing the number of frames which are received from port one but discarded as a result of the ingress rules 203 and the number of frames which are received from port one but discarded as a result of the forwarding process 205. Also calculated are the number of frames forwarded from all ports as the number of frames received from all ports minus the sum of the number of frames discarded as a result of the ingress rules of the ports minus the number of frames discarded by the forwarding process 205. Also calculated are the number of frames received in frame reception 201. Also calculated are the number of frames transmitted from port two as being equal to the sum of all frames forwarded to the egress port from the forwarding process 205 minus the frames discarded as a result of the egress rules 204. Naturally, these calculations can be performed in software by collecting the counts from the various counters and then summing and subtracting as described heretofore.

Although the present invention and its advantages have been described in detail, it should be understood that various changes, substitutions and alterations can be made herein without departing from the spirit and scope of the invention as defined by the appended claims.

What is claimed is:

1. A bridge adaptable for coupling to first and second LANs, comprising:
    a first port adaptable for coupling to the first LAN;
    a second port adaptable for coupling to the second LAN;
    a frame reception circuit coupled to the first port and operable for receiving frame packets from the first LAN through the first port;
    ingress rules processing circuitry coupled to the frame reception circuit and operable for receiving the frame packets from the frame reception circuit, wherein the ingress rules processing circuitry is operable for discarding certain ones of the frame packets according to one or more ingress rules;
    forwarding processing circuitry coupled to the ingress rules processing circuitry and operable for receiving the frame packets minus any of the certain ones of the frame packets that were discarded by the ingress rules processing circuitry, wherein the forwarding processing circuitry is operable for discarding certain ones of the frame packets according to one or more forwarding rules;
    egress rules processing circuitry coupled to the forwarding processing circuitry and operable for receiving the frame packets from the forwarding processing circuitry, wherein the egress rules processing circuitry is operable for discarding certain ones of the frame packets according to one or more egress rules;
    a frame transmission circuit coupled to the second port and operable for receiving frame packets from the egress rules processing circuitry;
    one or more first counters operable for counting the certain ones of the frame packets discarded by the ingress rules processing circuitry;
    one or more second counters operable for counting the certain ones of the frame packets discarded by the forwarding processing circuitry;
    one or more third counters operable for counting the certain ones of the frame packets discarded by the egress rules processing circuitry;
    a fourth counter operable for counting a number of frame packets forwarded by the frame reception circuit to the ingress rules processing circuitry;
    circuitry for calculating a number of frame packets forwarded by subtracting a sum of values within the one or more first counters and the one or more second counters from a value in the fourth counter; and
    circuitry for calculating a number of frame packets transmitted through the second port by subtracting a value within the one or more third counters from a sum of all the calculated numbers of frame packets forwarded by subtracting the sum of values within the one or more first counters and the one or more second counters from the value in the fourth counter.

2. The bridge as recited in claim 1, wherein the one or more first counters operable for counting the certain ones of the frame packets discarded by the ingress rules processing circuitry includes a counter for counting a number of unacceptable frame type discards.

3. The bridge as recited in claim 1, wherein the one or more first counters operable for counting the certain ones of the frame packets discarded by the ingress rules processing circuitry includes a counter for counting a number of frame packets received by the first port where there is a VLAN membership mismatch.

4. The bridge as recited in claim 1, wherein the one or more first counters operable for counting the certain ones of the frame packets discarded by the ingress rules processing circuitry includes a counter for counting a number of frame packets discarded because no VLAN registration exists on the bridge for the VLAN with which the frame packets are associated.

5. The bridge as recited in claim 1, wherein the one or more first counters operable for counting the certain ones of the frame packets discarded by the ingress rules processing circuitry includes a counter for counting a number of frame packets discarded because there are no other bridge ports associated with a VLAN with which the frame packets are associated.

6. The bridge as recited in claim 1, wherein the one or more third counters operable for counting the certain ones of the frame packets discarded by the egress rules processing circuitry includes a counter for counting a number of frame packets discarded because the second port is not a member of a VLAN with which the frame packets discarded are associated.

7. The bridge as recited in claim 1, wherein the one or more third counters operable for counting the certain ones of the frame packets discarded by the egress rules processing circuitry includes a counter for counting a number of frame packets discarded because embedded MAC addresses could not be translated if the frame packets were to be transmitted untagged.

8. A bridged local area network, comprising:
    a plurality of LANs, and one or more bridges coupling the plurality of LANs, wherein at least one of the one or more bridges further comprises:

a frame receiver operable for receiving frame packets from a first LAN of the plurality of LANs through a first port;

an ingress rules processor coupled to the frame receiver and operable for receiving the frame packets from the frame receiver, wherein the ingress rules processor is operable for discarding certain ones of the frame packets according to one or more ingress rules;

a forwarding processor coupled to the ingress rules processor and operable for receiving the frame packets minus any of the certain ones of the frame packets that were discarded by the ingress rules processor, wherein the forwarding processor is operable for discarding certain ones of the frame packets according to one or more forwarding rules;

an egress rules processor coupled to the forwarding processor and operable for receiving the frame packets from the forwarding processor, wherein the egress rules processor is operable for discarding certain ones of the frame packets according to one or more egress rules;

a frame transmitter operable for receiving frame packets from the egress rules processor;

one or more first counters operable for counting the certain ones of the frame packets discarded by the ingress rules processor;

one or more second counters operable for counting the certain ones of the frame packets discarded by the forwarding processor;

one or more third counters operable for counting the certain ones of the frame packets discarded by the egress rules processor; and a fourth counter operable for counting a number of frame packets forwarded by the frame receiver to the ingress rules processor.

9. The bridged local area network as recited in claim 8, wherein the at least one of the one or more bridges further comprises:

circuitry for calculating a number of frame packets forwarded by subtracting a sum of values within the one or more first counters and the one or more second counters from a value in the fourth counter.

10. The bridged local area network as recited in claim 8, wherein the at least one of the one or more bridges further comprises:

circuitry for calculating a number of frame packets transmitted through the second port by subtracting a value within the one or more third counters from a sum of all the calculated numbers of frame packets forwarded by subtracting the sum of values within the one or more first counters and the one or more second counters from the value in the fourth counter.

11. The bridged local area network as recited in claim 8, wherein the one or more first counters operable for counting the certain ones of the frame packets discarded by the ingress rules processor includes a counter for counting a number of frame packets received by the first port where there is a VLAN membership mismatch.

12. The bridged local area network as recited in claim 8, wherein the one or more first counters operable for counting the certain ones of the frame packets discarded by the ingress rules processor includes a counter for counting a number of frame packets discarded because no VLAN registration exists on the bridge for the VLAN with which the frame packets are associated.

13. The bridged local area network as recited in claim 8, wherein the one or more first counters operable for counting the certain ones of the frame packets discarded by the ingress rules processor includes a counter for counting a number of frame packets discarded because there are no other bridge ports associated with a VLAN with which the frame packets are associated.

14. The bridged local area network as recited in claim 8, wherein the one or more third counters operable for counting the certain ones of the frame packets discarded by the egress rules processor includes a counter for counting a number of frame packets discarded because the second port is not a member of a VLAN with which the frame packets discarded are associated.

15. The bridged local area network as recited in claim 8, wherein the one or more third counters operable for counting the certain ones of the frame packets discarded by the egress rules processor includes a counter for counting a number of frame packets discarded because embedded MAC addresses could not be translated if the frame packets were to be transmitted untagged.

16. The bridged local area network as recited in claim 8, wherein the one or more first counters operable for counting the certain ones of the frame packets discarded by the ingress rules processor includes a counter for counting a number of unacceptable frame type discards.

17. In a network bridge, a method comprising the steps of:

receiving frame packets from the a first LAN coupled to the bridge through a first port;

discarding certain ones of the frame packets according to one or more ingress rules;

discarding certain ones of the frame packets according to one or more forwarding rules;

discarding certain ones of the frame packets according to one or more egress rules;

counting the certain ones of the frame packets discarded according to the ingress rules to create a first counter value;

counting the certain ones of the frame packets discarded according to the forwarding rules to create a second counter value; and counting the certain ones of the frame packets discarded according to the egress rules to create a third counter value.

18. The method as recited in claim 17, further comprising the steps of:

counting a number of frame packets received from the first LAN to create a fourth counter value; and calculating a number of frame packets forwarded by subtracting a sum of the first and second counter values from the fourth counter value.

19. The method as recited in claim 18, further comprising the step of:

calculating a number of frame packets transmitted from the bridge by subtracting the third counter value from a sum of all the calculated numbers of frame packets forwarded by subtracting the sum of the first and second counter values from the fourth counter value.

20. The method as recited in claim 17, wherein the step of counting the certain ones of the frame packets discarded by the ingress rules includes a step of counting a number of frame packets discarded because no VLAN registration exists on the bridge for the VLAN with which the frame packets are associated.

21. The method as recited in claim 17, wherein the step of counting the certain ones of the frame packets discarded by the ingress rules includes a step of counting a number of frame packets discarded because there are no other bridge ports associated with a VLAN with which the frame packets are associated.

22. The method as recited in claim 17, wherein the step of counting the certain ones of the frame packets discarded by the egress rules includes a step of counting a number of frame packets discarded because a second port in the bridge is not a member of a VLAN with which the frame packets discarded are associated.

23. The method as recited in claim 17, wherein the step of counting the certain ones of the frame packets discarded by the egress rules includes a step of counting a number of frame packets discarded because embedded MAC addresses could not be translated if the frame packets were to be transmitted untagged.

24. The method as recited in claim 17, wherein the step of counting the certain ones of the frame packets discarded by the ingress rules includes a step of counting a number of unacceptable frame type discards.

25. The method as recited in claim 17, wherein the step of counting the certain ones of the frame packets discarded by the ingress rules includes a step of counting a number of frame packets received by the bridge where there is a VLAN membership mismatch.

26. A network bridge comprising:
    means for receiving frame packets from the a first LAN coupled to the bridge through a first port;
    means for discarding certain ones of the frame packets according to one or more ingress rules;
    means for discarding certain ones of the frame packets according to one or more forwarding rules;
    means for discarding certain ones of the frame packets according to one or more egress rules;
    means for counting the certain ones of the frame packets discarded according to the ingress rules to create a first counter value;
    means for counting the certain ones of the frame packets discarded according to the forwarding rules to create a second counter value; and
    means for counting the certain ones of the frame packets discarded according to the egress rules to create a third counter value.

27. The bridge as recited in claim 26, further comprising:
    means for counting a number of frame packets received from the first LAN to create a fourth counter value; and
    means for calculating a number of frame packets forwarded by subtracting a sum of the first and second counter values from the fourth counter value.

28. The bridge as recited in claim 27, further comprising:
    means for calculating a number of frame packets transmitted from the bridge by subtracting the third counter value from a sum of all the calculated numbers of frame packets forwarded by subtracting the sum of the first and second counter values from the fourth counter value.

29. The bridge as recited in claim 26, wherein the means for counting the certain ones of the frame packets discarded by the ingress rules includes a means for counting a number of frame packets discarded because no VLAN registration exists on the bridge for the VLAN with which the frame packets are associated.

30. The method as recited in claim 26, wherein the means for counting the certain ones of the frame packets discarded by the ingress rules includes a means for counting a number of frame packets discarded because there are no other bridge ports associated with a VLAN with which the frame packets are associated.

31. The method as recited in claim 26, wherein the means for counting the certain ones of the frame packets discarded by the egress rules includes a means for counting a number of frame packets discarded because a second port in the bridge is not a member of a VLAN with which the frame packets discarded are associated.

32. The method as recited in claim 26, wherein the means for counting the certain ones of the frame packets discarded by the egress rules includes a means for counting a number of frame packets discarded because embedded MAC addresses could not be translated if the frame packets were to be transmitted untagged.

33. The method as recited in claim 26, wherein the means for counting the certain ones of the frame packets discarded by the ingress rules includes a means for counting a number of unacceptable frame type discards.

34. The method as recited in claim 26, wherein the means for counting the certain ones of the frame packets discarded by the ingress rules includes a means for counting a number of frame packets received by the bridge where there is a VLAN membership mismatch.

\* \* \* \* \*